United States Patent [19]
Tomaru et al.

[11] Patent Number: 5,258,212
[45] Date of Patent: *Nov. 2, 1993

[54] INTEGRAL PACKING/COVERING MEMBER FOR HARD-DISC UNIT

[75] Inventors: Kazuhiko Tomaru; Akira Matsuda; Noboru Shimamoto, all of Gunma, Japan

[73] Assignee: Shin-Etsu Chemical Co., Ltd., Tokyo, Japan

[*] Notice: The portion of the term of this patent subsequent to Apr. 24, 2009 has been disclaimed.

[21] Appl. No.: 690,265

[22] Filed: Apr. 24, 1991

[30] Foreign Application Priority Data
Apr. 26, 1990 [JP] Japan .................................. 2-111406

[51] Int. Cl.$^5$ ........................... C08K 5/24; B65D 81/02
[52] U.S. Cl. .................... 428/36.8; 428/36.5; 428/71; 428/68; 428/304.4; 428/66; 428/308.4; 428/314.8; 428/315.7; 428/447; 428/313.3; 428/314.2; 528/15; 528/34; 206/524; 206/586; 206/521
[58] Field of Search ............. 428/36.5, 36.8, 304.4, 428/308.4, 314.8, 315.5, 315.7, 447, 313.3, 314.2, 71, 68, 66; 522/99; 525/476, 446; 528/901, 34, 15; 206/521, 524, 586; 360/97.02, 98.08

[56] References Cited

U.S. PATENT DOCUMENTS

| | | | |
|---|---|---|---|
| 4,072,635 | 2/1978 | Jeram | 260/2.55 |
| 4,421,783 | 12/1983 | Marwitz et al. | 427/54.1 |
| 4,580,794 | 4/1986 | Gibbons | 428/405 |
| 4,726,964 | 2/1988 | Isobe et al. | 427/54.1 |
| 4,990,560 | 2/1991 | Ikeno et al. | 524/731 |

FOREIGN PATENT DOCUMENTS 61-63991 2/1986 Japan .

Primary Examiner—Ellis P. Robinson
Assistant Examiner—Charles R. Nold
Attorney, Agent, or Firm—Millen, White, Zelano & Branigan

[57] ABSTRACT

An improvement is proposed in the assemblage of a cover-packing bult-up body for a magnetic hard-disc unit to be freed from the troubles caused by dusts or contamination of the gap space between the magnetic recording disc and the magnetic head as well as by the poor vibration-damping characteristics of the rubber packing between the covering member and the body of the casing. The improvement comprises, instead of using a pre-shaped rubber packing, the built-up body is assembled by using a curable liquid silicone rubber-based composition filled with fine hollow microspheres to form a packing on the surface of the covering member by the in situ curing of the composition applied thereto so that the rubbery packing layer has a spongy structure exhibiting good vibration-damping characteristics.

4 Claims, 2 Drawing Sheets

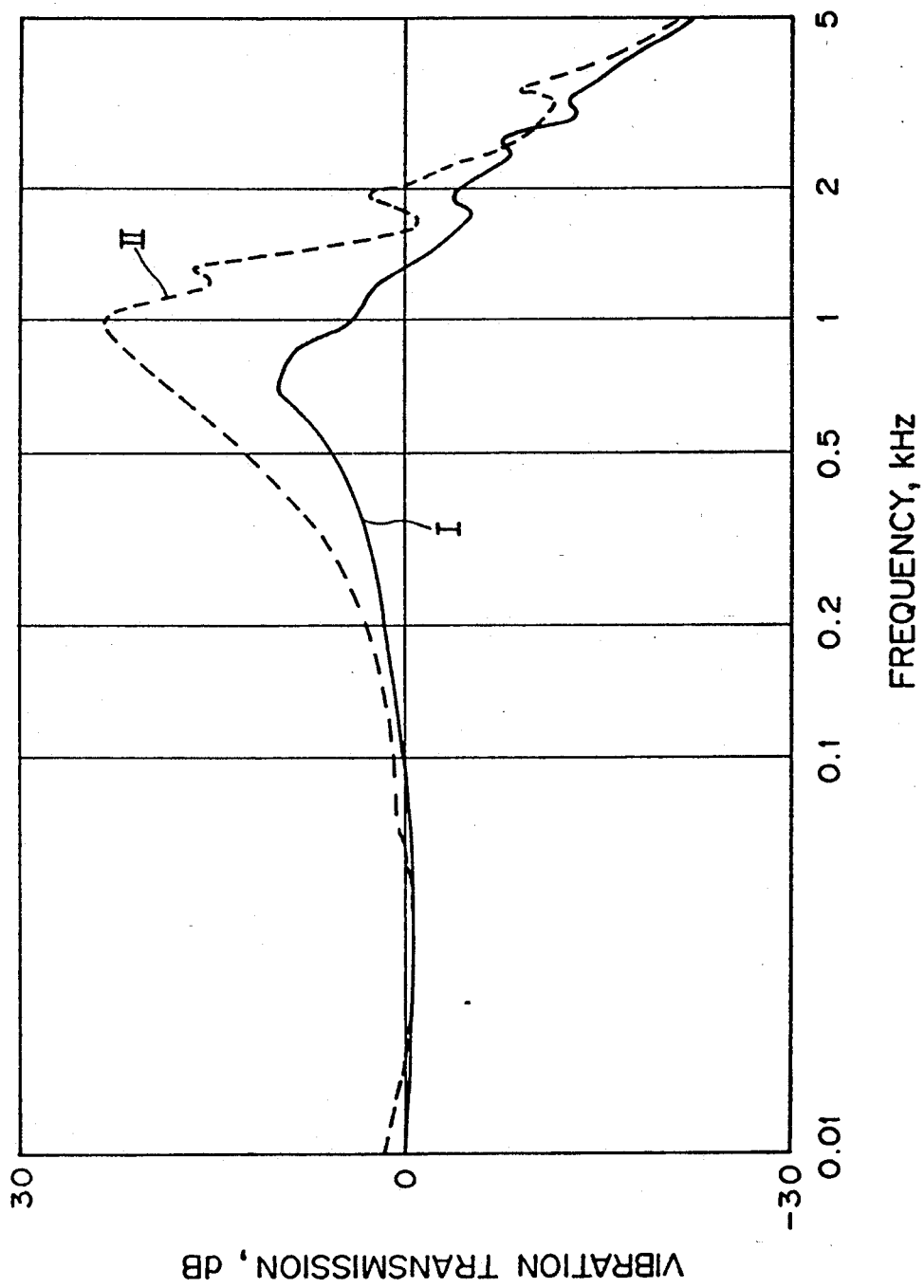

INTEGRAL PACKING/COVERING MEMBER FOR HARD-DISC UNIT

BACKGROUND OF THE INVENTION

The present invention relates to an integral packing-/covering member for a hard-disc unit or, more particularly, to such a member for a hard-disc unit formed by utilizing a self-adhesive liquid silicone rubber-based composition as a packing material in assemblage of the hard-disc unit.

The hard-disc unit here intended is a device comprising a discformed magnetic recording medium prepared by providing a disc of an aluminum alloy and the like with a magnetic recording layer, formed thereon by coating or sputtering, and having a casing containing the disc in a rotatable fashion so as to magnetically write information into the magnetic recording layer or read out the recorded information by means of a magnetic head held above the disc rotating at a high velocity with a very narrow gap of about 0.1 to 0.5 $\mu$m therebetween. Among various requirements for such a device, it is very important to prevent trouble caused by the dust coming from outside of or produced inside of the device such trouble includes head crashes and damages to the magnetic recording layer.

Accordingly, it is conventional in hard-disc units in order to solve the above mentioned problems due to dust that dust-free air through a high-performance filter is circulated inside the casing under a controlled pressure and any gaps between the casing and various covers are sealed by providing packing of a rubbery material. Various synthetic rubbers are used for this purpose including polychloroprene rubbers, urethane rubbers, silicone rubbers, acrylonitrile-butadiene copolymeric rubbers and the like. These rubbers are shaped into the form of packing either by compression molding in a metal mold or by punching of a pre-shaped rubber sheet using a punching die. The packing can be prepared also from a sheet of foamed bodies of these rubbers or polyethylenes.

The use of the above mentioned packing shaped in advance by compression molding or punching is not always quite advantageous because the pre-shaped packing must be coated with a pressure-sensitive adhesive, and the adhesive-coated surface must be protected temporarily with a sheet of release paper. This requires substantial labor, in addition to that required since the packing must be mounted on the device with extremely high exactness to achieve the desired position this necessitates utmost skillfulness and great time consumption, unavoidably resulting in an increase in production costs. In addition, the fastening force required for obtaining reliable sealing is sometimes quite large so as to cause distortion of the covering member.

Needless to say, the packing used for the above mentioned application must be very clean so as not to cause dust formation or contamination. It is a rather difficult matter to completely prevent contamination from the curable or pressure-sensitive adhesives used thereon and, when the finishing work of a compression-molded packing is imperfect, burrs or fins remaining on the surface of the packing sometimes fall off to form dust particles. When the packing is prepared from a sheet of foamed rubber body, dust particles are sometimes enclosed in the cells of the cellular foamed body and, eventually, will come out.

Alternatively, a proposal has been made that, in place of using a pre-shaped rubber packing, a liquid rubber composition curable into rubber is spread over the covering member or the interstices between the casing and the covering are filled therewith followed by in situ curing into rubber. This method is indeed effective in preventing the adverse influences caused by dust particles entering from outside or occuring inside the. However, certain in situ curable rubber compositions exhibit the phenomenon of bleeding of an oily matter or blooming of a powdery matter on the surface of the cured rubber accordingly, no complete solution could be obtained for the problems due to contaminants or dust particles. It is known that in situ curable silicone rubber compositions are the most advantageous among various types of in situ curable rubber compositions, by virtue of their small amount of bleeding or blooming, but they are not free from the problem. This is due to the volatility of low molecular-weight organopolysiloxanes contained in the composition, which are vaporized inside the device and then deposited, causing troubles.

The inventors have previously proposed that the above mentioned problem due to the low molecular-weight organopolysiloxanes contained in the in situ curable silicone rubber composition can be solved by using a specific composition. By this means, the problems due to contaminants or dusts can be solved almost completely. Hard-disc units prepared by using such an in situ curable silicone rubber composition as the packing material, however, are not without other problems. One of the problems still to be solved is relative to the transmission of vibration depending on the vibration-damping characteristic and sound-absorbing characteristic of the cured rubber, sometimes adversely influencing on the performance of the device.

SUMMARY OF THE INVENTION

The present invention accordingly has an object to provide an improvement in an integral packing/covering member for a hard-disc unit free from the disadvantages and problems in the prior art units, in particular, relative to damping of vibration.

Thus, the improvement of the invention involves an integral packing/covering member for a hard-disc unit in which a packing for sealing is formed by the in situ curing of a curable liquid rubber-based composition, the packing has a composite spongy structure and is composed of a cured silicone rubber composition as the matrix phase and hollow microspheres uniformly dispersed in the matrix phase, the void ratio, i.e., the volume ratio of the void space to the overall volume, being in the range from 1 to 96% by volume or, preferably, from 10 to 80% by volume.

BRIEF DESCRIPTION OF THE DRAWINGS

FIG. 3 is an illustration of the vibration-transmitting characteristic in dB of the integral packing/covering member for a hard-disc unit according to the invention making comparison with a conventional body having a non-spongy structure of the packing as a function of the frequency of vibration.

DETAILED DESCRIPTION OF THE PREFERRED EMBODIMENTS

Figure 1:
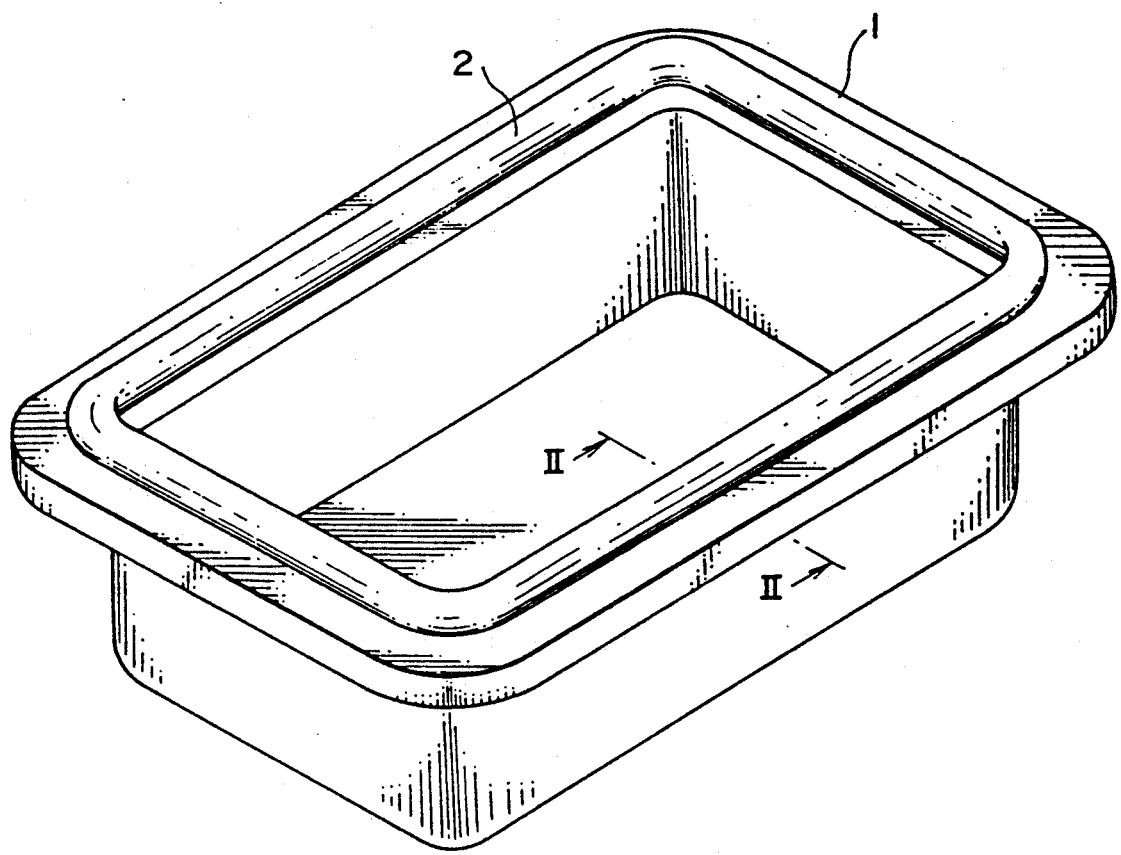
FIG. 1 is a perspective view of the integral packing-/covering member and FIG. 2 is a parital cross sectional view thereof as cut along the line and viewed in the direction indicated by the arrows II—II in FIG. 1.

As is described above, the scope of the present invention involves the improvement obtained by using a silicone rubber-based packing having a spongy structure as composed of cured silicone rubber as the matrix and fine hollow microspheres uniformly dispersed therein as a packing in the assemblage of a cover-packing built-up body into a hard-disc unit. Such a packing can be obtained from a curable liquid silicone rubber composition filled with thermally expandable or non-expandable fine hollow microspheres, of which the liquid silicone rubber composition as the matrix is then cured in situ into a silicone rubber.

The advantage obtained by the use of the above specified silicone rubber-based packing having a spongy structure are not limited to the advantages to be obtained by the use of a silicone rubber composition in general (which is inherently free from the problems of bleeding and blooming due to plastizers or other ingredients contained therein) and the advantages obtained by the use of an in situ cured rubber packing (free from the use of an adhesive liable to cause contamination) but include the advantage obtained by the greatly improved vibration-damping characteristics and reliable sealing obtained even with a relatively small fastening force.

Various types of curable liquid silicone rubber compositions are known depending on the mechanisms of the crosslinking reaction by which the liquid composition is cured into a silicone rubber. These include those curable by using an organic peroxide as a curing agent, condensation reaction-curable compositions and addition reaction-curable ones. Although any of these compositions can be used in the invention, the addition reaction-curable silicone rubber compositions are preferable with respect to their good shape-retention when the composition is put on the covering member, as well as their relatively high curing velocity. It is also desirable that the silicone rubber composition has self-adhesiveness, which means that firm adhesive bonding can be obtained between the cured silicone rubber layer and the substrate surface on which the silicone rubber composition has been cured in contact therewith, even without a pretreatment of the substrate surface with primer composition for improving the adhesion.

The above mentioned addition reaction-curable organopolysiloxane composition comprises, as the essential ingredients, (a) a diorganopolysiloxane of a linear molecular structure having, in a molecule, at least two aliphatically unsaturated groups or alkenyl groups such as vinyl and allyl groups, (b) an organohydrogenpolysiloxane having, in a molecule, at least two or, preferably, at least three hydrogen atoms directly bonded to the silicon atoms and (c) a small amount of a platinum compound which serves as a catalyst for promoting the addition reaction or so-called hydrosilation reaction between the alkenyl groups and the silicon-bonded hydrogen atoms. The composition may optionally contain as adhesion improver and a reinforcing filler such as a fumed or preceipated silica filler.

Besides the above mentioned alkenyl groups, the diorganopolysiloxane contains silicon-bonded monovalent hydrocarbon groups of 1 to 10 carbon atoms including alkyl groups such as methyl, ethyl, propyl and butyl groups and aryl groups such as phenyl and tolyl groups as well as those substituted hydrocarbon groups obtained by replacing a part or all of the hydrogen atoms in the above named hydrocarbon groups with halogen atoms and the like such as chloromethyl and 3,3,3-trifluoropropyl groups. It is preferable that all or most of the organic groups other than the alkenyl groups are methyl groups.

The organohydrogenpolysiloxane, which serves as a cross-linking agent of the above described diorganopolysiloxane, may have a molecular structure which can be either linear, cyclic or branched. An organohydrogenpolysiloxane having only two silicon-bonded hydrogen atoms in a molecule serves as a chain extender of the alkenyl-containing diorganopolysiloxane so as to contribute to the improvement of the cured silicone rubber by decreasing the hardness or increasing the tensile strength. Accordingly, it is possible to adequately control the mechanical properties of the cured silicone rubber, such as the hardness, elastic modulus and the like, by the combined use of an organohydrogenpolysiloxanes having, on one hand, only two of silicon-bonded hydrogen atoms in a molecule and, on the other hand, three or more of silicon-bonded hydrogen atoms in a molecule. The amount of the organohydrogenpolysiloxane contained in the addition reaction-curable silicone rubber composition should be sufficient to provide from 0.5 to 4.0 moles or, preferably, from 1.0 to 2.0 moles of the silicon-bonded hydrogen atoms per mole of the alkenyl groups in the diorganopolysiloxane. The organic groups in the organohydrogenpolysiloxane can be the same ones as in the diorganopolysiloxane excepting the alkenyl groups.

The platinum compound used as a catalyst includes chloroplatinic acid, alcohol solutions of chloroplatinic acid, complexes of chloroplatinic acid with an olefin or vinyl siloxane and the like.

Compounds used as the above mentioned adhesion improver in the composition include organosilicon compounds having functional groups to have an improving effect on the adhesiveness of the composition such as epoxy group, alkoxy groups and the like.

The addition reaction-curable silicone rubber composition used in the invention can be prepared by uniformly blending the above described essential and optional ingredients each in a specified amount. It is desirable that the thus prepared composition has a viscosity in the range from 1,000 to 100,000 poise at 25° C. as determined with a rotation viscosimeter with respect to the workability and shape retention when the composition is applied to the covering member of the hard-disc unit.

The above-described curable liquid silicone rubber composition is compounded with an appropriate amount of fine hollow microsphers to give a composition which is cured in situ into a cured silicone rubber-based packing having a spongy structure. Hollow microsphers of various kinds of inorganic and organic materails are obtained on the market including those of an inorganic material such as glass and fused silica and organic polymeric materials such as poly(vinyl chlorides), poly(vinyl acetates), polyesters, polycarbonates, polyethylenes, polystyrenes, poly(methyl methacrylates), poly(vinyl alcohols), ethyl celluloses, nitrocelluloses, benzyl celluloses, epoxy resins, hydroxypropyl methyl cellulose phthalates, poly(vinyl formals), copolymers of vinyl chloride and vinyl acetate, copolymers of vinyl acetate and cellulose acetate butyrate, copolymers of styrene and maleic acid, copolymers of acrylonitrile and styrene, copolymers of vinylidene chloride and acrylonitrile and the like. The method for the preparation of hollow microspheres from these inorganic and organic materials is well known in the art. Thermally expandable hollow microspheres can be used in the invention as prepared by impregnating hollow microspheres under pressurization with a volatile liquid having a low boiling point such as n-butane, isobutane and the like. Thermally expandable hollow microspheres are sometimes preferred with respect to the workability of the rubber composition before thermal curing, in particular, when the compounded amount of the hollow microspheres is relatively large. The fine hollow microspheres, after thermal curing when they are thermally expandable, should have a diameter preferably in the range from 1 to 500 μm or, perferably, from 5 to 100 μm. It is desirable that the hollow microspheres may have a heat resistance suitable for use at a temperature of 60° C. or higher or, more desirably, 80° C. or higher.

The amount of the fine hollow microspheres compounded with the curable silicone rubber composition to give the in situ curable composition for packing is in the range from 0.1 to 50 parts by weight or, preferably, from 1 to 30 parts by weight per 100 parts by weight of the curable silicone rubber composition. The exact amount thereof should be selected in consideration of the desired void ratio, i.e. the volume ratio of the void space to the overall volume, in the in situ cured rubbery packing, which should be in the range from 1 to 96% by volume or, preferably, from 10 to 80% by volume. When the amount of the hollow microspheres is too small, no well-developed spongy structure can be obtained in the in situ cured rubber packing of the composition while, when the amount thereof is too large, the rubbery packing formed by the in situ curing of the composition may have an unduly increased permanent compression set. At any rate, the packing composition prepared by compounding the curable silicone rubber composition and the fine hollow microspheres should desirably have a consistency in the range from 1000 to 100,000 poise at 25° C. as determined with a rotation viscosimeter in view of the workability of the composition and shape-retentivity when the composition is applied to the surface of a covering member.

Figure 2:
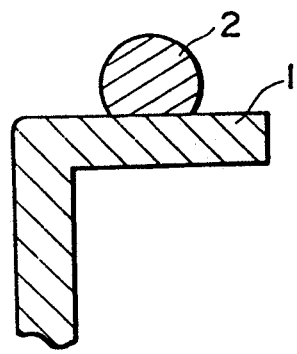

The in situ formation of a packing by using the curable liquid silicone rubber-based composition in the invention to prepare an integral member illustrated in FIG. 1 by a perspective view and in FIG. 2 by a partial cross sectional view can be performed according to a known procedure in which the liquid composition in a reservoir vessel is transferred to a coating nozzle by pumping and a covering member 1 of the hard-disc unit is coated with the liquid composition extruded out of the nozzle on a specified area followed by curing of the composition, if necessary, under heating resulting in in situ formation of the packing body 2. The coating work can be performed accurately and efficiently by using a robotized coating machine operated by an input memory for the pattern of the areas to be coated with the silicone rubber-based composition. When a relatively narrow line area on the substrate surface is coated with the liquid composition, the coating layer of the line usually has a cross sectional profile of a semicircle although the head line of the coating layer of a semicircular cross section can be flattened by controlling various factors. The coating layer of the liquid composition can be readily cured into a silicone rubber-based packing having a spongy structure by heating at a temperature of 50° to 220° C. on the covering member. The curing can be performed also by the irradiation with ultraviolet light or electron beams depending on the types of the curable silicone rubber composition. At any rate, it is desirable that the silicone rubber-based packing formed in situ by curing the liquid composition has a hardness of 5 to 60 in the JIS A scale specified in JIS K 6301.

The covering member which is integral with the silicone rubber-based packing having a spongy structure formed in situ from the liquid silicone rubber-based composition is then fastened to a casing of the hard-disc unit, for example, by screwing to give a hard-disc unit integrated with the packing/covering member. When the thus in situ formed silicone rubber-based packing having a spongy structure has a hardness in the above mentioned range, it serves to effectively reduce the stress load on the covering. The integral packing/covering member for the hard-disc unit is then subjected according to need to a cleaning treatments of washing with water, washing with an air blow, drying and the like prior to fastening to the casing body with screws to ensure a tightly sealed condition. By virtue of the spongy structure of the thus formed packing, the built-up body as assembled can be used as a hard-disc unit without any trouble due to poor vibration-damping characteristics in addition to the trouble caused by dust particles.

In the following, the invention is illustrated in more detail by way of examples and comparative examples.

EXAMPLE 1

A lot of top cover members of aluminum after coating by electrodeposition with an epoxy-based coating composition were each coated on a specified area by using a robotized coating machine running along the pattern of the input memory with an in situ curable liquid composition having a consistency of 20,000 poise at 25° C. as prepared by uniformly blending 100 parts by weight of a self-adhesive addition reaction-curable silicone rubber composition (X-65-257, a product of Shin-Etsu Chemical Co.) having a viscosity of 15,000 poise at 25° C. and 10 parts by weight of thermally expandable fine hollow micro spheres of a vinylidene chloride-acrylonitrile copolymer having an average particle diameter of about 10 μm and about 40 μm before and after thermal expansion, respectively, and a bulk density of about 0.7 g/cm$^3$ and less than 0.02 g/cm$^3$ before and after thermal expansion, respectively (Expancel DU 461, a product of Nippon Fillite Co.). The silicone rubber composition X-65-257 was a product prepared by uniformly blending 100 parts by weight of a dimethylpolysiloxane having a viscosity of 100,000 centistokes at 25° C. and terminated at each molecular chain end with a trivinyl siloxy group to contain 0.006 mole/100 g of vinyl groups, 0.3 part by weight of a methyl hydrogen polysiloxane containing 0.009 mole/g of silicon-bonded hydrogen atoms, 0.2 part by weight of a 1% isopropyl alcohol solution of chloroplatinic acid, 2.0 parts of 1,3,5,7-tetramethyl-1-(3-glycidyloxypropyl)cyclotetrasiloxane as an adhesion improver, 15 parts of a fumed silica filler having a specific surface area of 200 m$^2$/g after s surface treatment with trimethyl chlorosilane and 0.6 part by weight of an addition-reaction moderator. The operating conditions of the robotized coating machine included: 1.0 mm of the inner diameter of the coating nozzle; 2.0 kgf/cm$^2$ of the pumping pressure; 200 cm/minute of the line-wise coating speed; and 1.3 mm of the nozzle height above the surface of the substrate.

The covering members after coating in the above described manner were heated for 30 minutes in a hot-air circulation oven at 150° C. to have the composition cured into a rubbery packing having a hardness of 10 in the JIS A scale on the covering member. The thus formed line-wise rubbery packing on the covering member having a spongy structure had an apparent density of 0.25 g/cm³ with a void ratio of 50% and a semicircular arching cross section having a height of 2.0 mm and a base width of 2.5 mm. Adhesion of the rubbery packing layers to the substrate surface was very firm.

The cover-packing built-up bodies prepared in the above described manner were rinsed with pure water having an electroconductivity of $10 \times 10^{-6}$ mho or smaller after filtration through a membrane filter of 0.5 μm pore diameter, dried in a clean room of cleanness 100 (0.3 μm) and clean-packed. These clean-packed built-up bodies were brought into an assemblage line of hard-disc units where they were built into the respective hard-disc units, all of which could pass the tests for the leakage of air and cleanness.

EXAMPLE 2

Another in situ curable rubbery composition for packing was prepared from 100 parts by weight of the same addition reaction-curable liquid silicone rubber composition as used in Example 1, 10 parts by weight of thermally expanded fine microspheres (Expancel DE 461, the same as but ready-expanded product of Expancel DU 461, supra) and 10 parts by weight of isopropyl alcohol as a moistening agent for the hollow microspheres. A lot of top cover members of aluminum before coating with an epoxy-based coating composition were each coated on a specified area by using a robotized coating machine running along the pattern of the input memory with the above prepared in situ curable liquid composition having a consistency of 25,000 poise at 25° C. The operating conditions of the robotized coating machine included: 1.5 mm of the inner diameter of the coating nozzle; 2.5 kgf/cm² of the pumping pressure; 300 cm/minute of the line-wise coating speed; and 1.8 mm of the nozzle height above the surface of the substrate.

The covering members after coating in the above described manner were heated for 30 minutes in a hot-air circulation oven at 150° C. to have the composition cured into a rubbery packing on the covering member. The thus formed line-wise rubbery packing on the covering member having a spongy structure and a hardness of 7 in the JIS A scale had an apparent density of 0.40 g/cm³ with a void ratio of 35% by volume and a semicircular arching cross section having a height of 1.3 mm and a base width of 1.8 mm. Adhesion of the rubbery packing layers to the substrate surface was very firm.

These covering members provided with the in situ formed rubbery packing having a spongy structure were treated and assembled in the same manner as in Example 1 into respective hard-disc units which were found quite satisfactory in the tests for air leakage and cleanness.

These hard-disc units were further tested for the characteristic of vibration transmission. Thus, an acceleration sensor was attached on to the covering member and the signals generated in the sensor when the body of the hard-disc unit was vibrated at different frequencies were detected and recorded by using an FFT analyzer (Model CF 930, manufactured by Ono Sokuteiki Co.) to give the results of the vibration transmission test in dB shown in FIG. 3 of the accompanying drawing by the curve I as a function of the frequency.

For comparison, the same vibration-damping test as above was undertaken except that the in situ formed rubbery packing, which had a hardness of 28 in the JIS A scale, was formed by using the curable silicone rubber composition X-65-257 as such without filling with the hollow microspheres. The results of the vibration transmission test in dB are shown in FIG. 3 of the accompanying drawing by the curve II as a function of the frequency. Comparison of the curves I and II in FIG. 3 clearly supports the conclusion that the hard-disc unit prepared according to the invention is very advantageous with respect to the characteristic of vibration damping.

What is claimed is:

1. In an integral packing/covering member for a hard-disc unit having a rubbery packing on a peripheral flange thereof, in which the packing is formed by the in situ curing of a curable liquid rubber-based composition, the improvement wherein the packing has a composite spongy structure composed of a cured silicone rubber composition as a matrix phase and hollow microspheres uniformly dispersed in the matrix phase, with a void ratio of from 1% to 96% by volume, and the matrix phase of the cured silicone rubber composition is formed by curing an addition reaction-curable silicone rubber composition comprising: (a) a diorganopolysiloxane of a linear molecular structure having at least two alkenyl groups, (b) an organohydrogenpolysiloxane having at least two hydrogen atoms directly bonded to silicon atoms, and (c) a platinum compound which serves as a catalyst for promoting the addition reaction between the alkenyl groups and the silicon-bonded hydrogen atoms.

2. The packing/covering member of claim 1, in which the hollow microspheres have an average particle diameter in the range of from 1 μm to 500 μm.

3. The packing/covering member of claim 1, in which the amount of the hollow microspheres is 0.1 to 50 parts by weight by 100 parts by weight of the curable silicone rubber composition.

4. The packing/covering member of claim 1, in which the packing has a hardness in the range of from 5 to 60.

* * * * *